United States Patent [19]

Loiselle et al.

[11] Patent Number: 5,414,023

[45] Date of Patent: May 9, 1995

[54] THIXOTROPIC FOAMABLE ORGANOSILOXANE COMPOSITIONS

[75] Inventors: Brian P. Loiselle, Midland; Thomas G. Jacobs, Jr., Hemlock, both of Mich.

[73] Assignee: Dow Corning Corporation, Midland, Mich.

[21] Appl. No.: 245,347

[22] Filed: May 18, 1994

[51] Int. Cl.⁶ .................................. C08J 9/02
[52] U.S. Cl. ........................... 521/88; 521/77; 521/97; 521/154
[58] Field of Search ............... 521/77, 88, 97, 154

[56] References Cited

U.S. PATENT DOCUMENTS

| | | | |
|---|---|---|---|
| 3,923,705 | 12/1975 | Smith | 260/2.5 |
| 4,026,843 | 5/1977 | Kittle | 260/2.5 |
| 4,189,545 | 2/1980 | Modic | 521/131 |
| 4,490,488 | 12/1984 | Cush | 521/154 |
| 4,497,919 | 2/1985 | Varga et al. | 524/10 |
| 4,590,222 | 5/1986 | Bauman | 521/88 |
| 4,599,367 | 7/1986 | Bauman et al. | 521/71 |
| 5,225,452 | 7/1993 | Colas et al. | 521/154 |
| 5,252,627 | 10/1993 | Bauman et al. | 521/154 |

FOREIGN PATENT DOCUMENTS

| | | | |
|---|---|---|---|
| 0198536 | 4/1986 | European Pat. Off. | H05B 41/231 |
| 2038309 | 2/1990 | Japan . | |

OTHER PUBLICATIONS

Kirk-Othmer, Encyclopedia of Chemical Technology: Third edition, vol. 19 "Powder Coatings To Recycling", John Wiley & Sons.

Kirk-Othmer, Encyclopedia of Chemical Technology: Third Edition, vol. 20 "Refractories To Silk", John Wiley & Sons.

Primary Examiner—Morton Foelak
Attorney, Agent, or Firm—Robert Spector

[57] ABSTRACT

The presence in foamable, curable organosiloxane compositions of a hydrogenated glyceride of an ethylenically unsaturated carboxylic acid imparts sufficient thixotropy to the uncured composition to inhibit flow without adversely affecting desirable properties of the cured foam such as density and texture.

5 Claims, No Drawings

THIXOTROPIC FOAMABLE ORGANOSILOXANE COMPOSITIONS

BACKGROUND OF THE INVENTION

1. Field of the Invention

This invention relates to foamable organosiloxane compositions. More particularly, this invention relates to foamable organosiloxane compositions containing an additive that imparts thixotropy to the compositions without adversely affecting other properties of the compositions or cured foams prepared from the compositions. The additive is particularly useful for preparing low density foams of small cross-sectional area.

2. Background Information

Foamable compositions comprising a curable liquid polyorganosiloxane, an organohydrogensiloxane, a hydroxyl-containing compound and a platinum group metal or a compound thereof as the foaming and curing catalyst have been described in the patent and journal literature. Relevant patents include U.S. Pat. Nos. 3,923,705, which issued on Dec. 2, 1975; 4,026,843, which issued on May 31, 1977; 4,189,545, which issued on Feb. 19, 1980; 4,590,222, which issued on May 20, 1986; and 4,599,367, which issued on Jul. 8, 1986, and 5,252,627, which issued on Oct. 12, 1993.

The curable polyorganosiloxane used to prepare the foam contains at least two alkenyl or silanol groups per molecule. If the polyorganosiloxane does not contain silanol groups a low molecular weight hydroxyl compound such as an alcohol, silanol or siloxanol is included in the reaction mixture to generate the hydrogen required for foaming of the composition.

For certain end use applications such as gaskets it is desirable that the cured foam have a density less than 20 lb/ft$^3$ (0.32 g/cc). The viscosity of the curable organosiloxane compositions used to prepare these foams is typically from 20 to 70 Pa.s. These composition flow to the extent that it is difficult to prepare three dimensional objects in the absence of dams or other barriers to prevent flowing of the composition prior to curing.

A variety of additives have been used to impart thixotropic character to liquid compositions, thereby reducing the tendency of the these compositions to flow in the absence of shearing forces. These additives include finely divided forms of untreated silica, silica that has been treated with silanes or other liquid hydroxyl-containing organosilicon compounds, asbestos fibers, carbon black and other forms of finely divided carbon, clays that have been treated with quaternary ammonium compounds, phthalocyanine and other organic pigments, finely divided metal carbonates, oxides, hydroxides and silicates, lithium hydroxystearate, soaps of aluminum and other metals, cellulose esters, colloidal forms of alkali or alkaline earth metal aluminum silicates, and hydrogenated glycerides of unsaturated fatty acids, such as those present in castor oil. These thixotropic agents are disclosed in one or more of the following references:

European Published Application No. 0198536, published on May 16, 1984;
U.S. Pat. No. 4,497,919, published Feb.5, 1985;
Japanese Laid Open Application No. 2/38,309, published Feb. 7, 1990; and
The third edition of the Kirk Othmer Encyclopedia of Chemical Technology, volume 19, page 530 and volume 20, page 262.

The present inventors discovered that some of the known thixotropic agents, particularly treated and untreated forms of finely divided silicas, adversely affect the processability of foamable organosiloxane compositions in addition to altering the texture, density and other physical properties of the cured foam to the extent that the foam is no longer suitable for its intended end use.

One objective of this invention is to provide foamable compositions that can be formed into three dimensional low density cured articles by casting or extrusion on to unobstructed surfaces.

SUMMARY OF THE INVENTION

The objectives of the present invention are achieved by the presence in the foamable organosiloxane composition of a hydrogenated castor oil or other hydrogenated glyceride of an ethylenically unsaturated fatty acid.

DETAILED DESCRIPTION OF THE INVENTION

This invention provides an improved foamable organosiloxane composition comprising A. a liquid polyorganosiloxane containing at least two reactive groups per molecule selected from the group consisting of silanol groups and alkenyl radicals;
B. an amount sufficient to foam and cure said composition of an organohydrogensiloxane containing at least three silicon-bonded hydrogen atoms per molecule wherein there is no more than one of said hydrogen atoms per silicon atom;
C. a compound containing at least one carbinol or silanol group per molecule; and
D. as the catalyst, an amount of a metal from the platinum group of the periodic table or a compound of said metal sufficient to promote foaming and curing of said composition, wherein the improvement comprises the presence in said composition of a thixotropic additive in an amount sufficient to prevent substantial flowing of said composition prior to curing, said additive consisting essentially of the hydrogenated glyceride of at least one ethylenically unsaturated carboxylic acid containing from 12 to 20 carbon atoms.

The Thixotropic Additive (Ingredient E)

The characterizing feature of the present foamable compositions is the presence as a thixotropic agent of a hydrogenated glyceride derived from at least one ethylenically unsaturated carboxylic acid containing from 12 to 20 carbon atoms and at least one hydroxyl group as an optional substituent. These acids are also referred to as unsaturated fatty acids, and include but are not limited to dodecanoic, oleic, linoleic and ricinoleic (12-hydroxy-9-octadecenoic) acids. Hydrogenated castor oil, a mixture of the glycerides of ricinoleic, oleic and linoleic acids, is a preferred thixotropic agent based on its cost and availability.

Hydrogenated fatty acid glycerides are considered unique among the known thixotropic agents for use in the present compositions based on their ability to prevent substantial flowing of an otherwise flowable curable organosiloxane composition prior to curing when the composition is applied to an inclined or vertical surface. Unlike other known thixotropic additives for organosiloxane compositions, such as finely divided forms of silica, the present thixotropic agents do not adversely affect the processability of the curable organosiloxane composition or the desired properties of the cured foam, particularly its texture and density.

The thixotropic agent constitutes from 0.5 to 5 weight percent, preferably from 1 to about 4 weight percent, of the present compositions. Concentrations greater than about 5 weight percent make the compositions difficult to process in conventional mixing equipment.

The Curable Polyorganosiloxane Composition

Two types of curable organosiloxane compositions are suitable for use with the present thixotropic additives. In both types the hydrogen required to form the cellular structure of the foam is generated by the reaction of silanol or hydroxyl groups with silicon-bonded hydrogen atoms in the presence of a suitable catalyst, typically a metal from the platinum group of the periodic table or a compound of one of these metals. The reaction occurs concurrently with curing of the organosiloxane composition.

The Curable Polyorganosiloxane (Ingredient A)

One type of curing reaction involves silicon-bonded hydrogen atoms present on a curing agent and silanol groups present on the curable polyorganosiloxane. The hydrogen required as a blowing agent is generated as a by-product of this reaction.

The second type of curing reaction is a hydrosilation reaction between alkenyl radicals present on the curable polyorganosiloxane and silicon-bonded hydrogen atoms present on the curing agent.

Depending upon the properties desired in the cured foam the curable composition contains at least one silanol-functional polyorganosiloxane, alkenyl-functional polyorganosiloxane or a mixture of both types of polyorganosiloxanes.

It will be understood that if the polyorganosiloxane does not contain a sufficient concentration of silanol groups to generate the hydrogen required for a satisfactory foam, additional compounds containing hydroxyl or silanol groups, referred to in this specification as ingredient C, must be present in the curable composition. The silanol groups can be present on silanes or low molecular weight organosiloxanes, and the hydroxyl groups are typically present as water or as the reactive groups of a mono- or polyhydric alcohol.

Suitable alcohols contain from 1 to 12 carbon atoms, and include but are not limited to methanol, ethanol, propanol, benzyl alcohol, lauryl alcohol, ethylene glycol, propylene glycol, and 1,4-butanediol. The use of alcohols to modify the physical properties of foams prepared using curable organosiloxane compositions is described in U.S. Pat. No. 4,590,222, which issued on May 20, 1986, the relevant disclosures of which are incorporated by reference.

Suitable curable polyorganosiloxanes contain at least two alkenyl radicals or silanol groups per molecule and exhibit a viscosity of from 0.1 to 100 Pa.s at 25° C. At least 90 percent of the repeating units in this polyorganosiloxane are diorganosiloxane units represented by the general formula $R^1R^2SiO$ where $R^1$ and $R^2$ are individually selected from monovalent unsubstituted and substituted hydrocarbon radicals that typically contain from 1 to 10 carbon atoms. The alkenyl radicals and silanol groups that characterize the curable polyorganosiloxane are preferably located at the terminal positions of the molecule, however one or more can be bonded to non-terminal siloxane units as well.

In preferred curable polyorganosiloxanes at least one of the hydrocarbon radicals bonded to each silicon atom is preferably methyl and any remaining ones are phenyl, 3,3,3-trifluoropropyl or alkenyl.

The Curing Agent (Ingredient B)

The present compositions contain at least one organohydrogensiloxane that supplies the silicon-bonded hydrogen atoms required to cure the composition and generate the hydrogen gas that creates the cellular structure of the final foam. The organohydrogensiloxane can have a linear or branched structure, and can be homopolymers, copolymers or mixtures of these two types of polymers.

A preferred linear type of organohydrogensiloxane exhibits a viscosity of from 0.01 to 10 Pa.s at 25° C. and comprises dialkylsiloxane and alkylhydrogensiloxane units with trialkylsiloxy terminal units. The alkyl radicals contain from 1 to 4 carbon atoms, and are most preferably methyl.

Preferred compositions contain two types of organohydrogensiloxanes, one of which is a polymethylhydrogensiloxane and the second a copolymer containing methylhydrogensiloxane and dimethylsiloxane units.

The relative concentrations of curable polyorganosiloxane (ingredient A) and organohydrogensiloxane (Ingredient B) in the present compositions is equivalent to a molar ratio of silicon-bonded hydrogen atoms to the combination of alkenyl radicals, silanol groups and carbinol groups that is typically from 3.5:1 to 5.5:1, and preferably about 5:1.

The Curing Catalyst (Ingredient D)

The reactions used to foam and cure the present compositions are catalyzed by metals from the platinum group of periodic tables and compounds of these metals. Preferred catalysts include platinic chloride, chloroplatinic acid and coordination complexes of these compounds with ethylenically unsaturated organosiloxanes such as divinyltetramethyldisiloxane. These coordination complexes can be prepared as described in U.S. Pat. No. 3,419,593, which issued on Dec. 31, 1968, which is incorporated herein by reference.

The concentration of catalyst is typically equivalent to from 3200 to 6000 parts of platinum group metal per one million parts by weight of curable composition.

Optional Ingredients

In addition to the ingredients identified as A, B, C, D and E, the present compositions can contain various ingredients to modify the properties of the curable composition and/or the cured foam.

These optional ingredients include but are not limited to finely divided reinforcing and non-reinforcing mineral fillers such as quartz and calcium carbonate; metal oxides such as alumina, hydrated alumina, ferric oxide and titanium dioxide; pigments such as carbon black and zinc oxide; organic pigments and dyes, anti-oxidants, heat stabilizers, ultraviolet stabilizers, flame retarding agents and catalyst inhibitors such as cyclic methylvinylsiloxanes to increase the working time of the curable composition.

A preferred optional ingredient in the present compositions is a resinous organosiloxane copolymer containing triorganosiloxy and $SiO_{4/2}$ units. The triorganosiloxy units in this type of copolymer can be represented by the formula $R^3{}_3SiO_{\frac{1}{2}}$, where $R^3$ represents a monovalent unsubstituted or substituted hydrocarbon radical. In preferred copolymers the hydrocarbon radicals represented by $R^3$ are a combination of lower alkyl, most preferably methyl. The molar ratio of triorganosiloxy units to $SiO_{4/2}$ units in the copolymer is typically from 0.7 to 1.2, inclusive. The copolymer constitutes up to 30 percent of the combined weight of the curable alkenyl-substituted polyorganosiloxane and the copolymer, and at least a portion of the silicon atoms in the copolymer contain ethylenically unsaturated hydrocarbon radicals such as vinyl as substituents.

Preparation of Curable Compositions

The compositions of this invention are prepared by blending the ingredients of these compositions to homogeneity. To maximize the beneficial effect of the thixotropic additive the compositions containing this additive are heated to a temperature of at least 65%20 C., preferably about 70° C., and mixed using a high rate of shear, which activates the thixotropic additive. The desired shear rate can be achieved by using a stirring blade rotating at a speed of about 200 revolutions per minute. This shear rate is maintained while the composition is allowed to cool to a temperature of about 40° C.

The present compositions begin to cure and foam when ingredients A, B, C and D are combined. If it is desired to store the compositions prior to curing them this can be achieved by packaging the ingredients in two or more containers with the organohydrogensiloxane and curing catalyst in separate containers.

Both the curing and foaming reactions are accelerated by heating the curable composition. Reaction temperatures from about 30° to 65° C. are preferred. The time required for foaming and curing of the present compositions is typically from 3 to 30 minutes, based on the reactivity of the ingredients and the temperature.

The present compositions are particularly useful for preparing low density foams exhibiting a soft, resilient texture. Preferred foams have densities less than about 20 pounds per cubic inch (320 kg/m$^3$) and can be compressed to 50 percent of their height under a loading of about 4 psi (27.6 KPa) or less.

The following examples describe preferred embodiments of the present compositions and should not be interpreted as limiting the scope of the invention defined in the accompanying claims. All parts and percentages in the examples are by weight and viscosities were measured at 25° C.

EXAMPLE 1

This example demonstrates that while both hydrogenated castor oil and fumed silica will impart thixotropic flow properties to foamable compositions, both the untreated and treated forms of silica adversely affect the cell structure and texture of the cured foam.

Two curable organosiloxane compositions of this invention (referred to hereinafter as compositions 1 and 2) were prepared as two-part compositions consisting of a base and a curing agent. The base and curing agent portions of each composition were prepared by blending the ingredients to homogeneity, heating the resultant mixture to 70 and then cooling to ambient temperature using a circulating water bath.

The base portions contained the following ingredients:

60 parts of a liquid dimethylvinylsiloxy terminated polydimethylsiloxane exhibiting a viscosity of 55 Pa.s at 25° C.

24 parts of a benzene soluble resinous copolymer containing triorganosiloxy units and $SiO_2$ units in the molar ratio of 0.7 mol of triorganosiloxy units per mol of $SiO_2$ units, where the triorganosiloxy units are trimethylsiloxy and dimethylvinylsiloxy, and the copolymer contains about 1.8 weight percent of vinyl radicals.

15 parts of alumina trihydrate, 7 parts of benzyl alcohol, 1 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, 0.6 part of carbon black, and a hydrogenated castor oil available as Thixin R(R) from Rheox, Inc.

The curing agent portion of each composition contained 45 parts of the liquid polydimethylsiloxane present in the base portion;

10 parts of the resinous copolymer present in the base portion;

25 part of quartz with an average particle size of 5 microns;

12 parts of a mixture containing equal parts by weight of (1) a trimethylsiloxy-terminated organohydrogensiloxane containing 1.6 percent silicon bonded hydrogen and (2) an organosiloxane copolymer consisting essentially of $(CH_3)_3SiO_{\frac{1}{2}}$ and $SiO_2$ units with a molar ratio of $CH_3)_3SiO_{\frac{1}{2}}:SiO_2$ units of about 0.75. The resin can be prepared as described in U.S. Pat. No. 2,676,182 to Daudt et al. and contains from about 1.7 weight percent of hydroxyl groups.

5 parts of a trimethylsiloxy-terminated polydiorganosiloxane containing an average of five methylhydrogensiloxane units and three dimethylsiloxane units per molecule with a silicon-bonded hydrogen atom content of 0.8 weight percent;

0.4 part of cyclic methylvinylsiloxanes; and the hydrogenated castor oil present in the base portion.

The base and curing agent portions each contained 1 part (in composition 1) or 3 parts (in composition 2) of the hydrogenated castor oil.

Foamable compositions were prepared by blending equal weights of the base and curing agent portions of each composition in a cup for 1 minute using a spatula. The resultant foam was allowed to rise under ambient conditions for at least one hour, at which time the density of the foam was determined.

The flow characteristics of the foamable compositions were determined using a test device described in U.S. Military Specification (Mil Spec) 46146. The device was a block containing a circular cavity in one surface. The cavity measures 1.5 inches (3.8 cm.) in diameter and 0.375 inch (1.6 cm)in depth. A ram having the substantially the same diameter as the cavity and a thickness of ¼ inch (0.64 cm) is located at the bottom of the cavity.

With the surface containing the cavity in a horizontal position the cavity is filled with the curable composition to be evaluated. Any material extending above the cavity is removed and the surface containing the cavity is placed in a vertical position. The material in the cavity is then ejected using the ram and allowed to flow down the vertical surface containing the cavity until the foam cures, which required from 0.5 to 1 hour. The maximum distance over which the composition flowed during this period is measured and recorded.

Samples for determining compression deflection, a measure of compressibility, and compression set were prepared by dispensing a foamable composition between two sheets of polyester film separated by 0.062 inch (0.16 cm)—thick shims. The composition was then allowed to foam and cure, at which time the polyester sheets were removed. Compression set was determined by compressing a cured foam sample of known thickness to 50% of its initial height using the procedure and formula described in American Society of Testing Methods (ASTM) procedure D1056, a temperature of 80° C. for 5 days and a recovery time of 30 minutes.

Compression deflection was determined by measuring the force required to compress the foam to 50 percent of its initial height.

Comparative compositions were prepared and evaluated as foams using the same types and amounts of ingredients as compositions 1 and 2 of the present invention, but omitting the thixotropic additive and the carbon black (composition 3). Three additional comparative compositions (4, 5 and 6) were prepared by adding 3, 5 and 7 weight percent, respectively, of an untreated fumed type silica having a surface area of 90 m$^2$/g to composition 3. Comparative composition 7 and 8 contained 3 and 5 weight percent, respectively, of a silica with a surface area of 255 m$^2$/g in place of the silica of compositions 4 and 5. Comparative compositions 9, 10 and 11 were prepared by adding to composition 3 concentrations of 3, 4 and 5 weight percent, respectively, of a fumed type silica that had been treated with a hydroxyl-containing polydimethylsiloxane.

The density, flow, compression deflection and compression set exhibited by the compositions evaluated are summarized in Table 1. Compositions 3-11 were prepared for comparative purposes and are not within the scope of the present invention.

TABLE 1

| Comp. | Density lbs/ft$^3$//Kg/m$^3$ | Flow in/cm | Compression/ Deflection Lb/in$^2$//KPa | Compress. Set (%) |
| --- | --- | --- | --- | --- |
| 1 | 16.9/270.4 | 1.95/4.95 | 19.90/137.3 | 8.19 |
| 2 | 14.5/232 | 2.00/5.1 | 10.25/70.7 | 6.51 |
| 3 | 11.7/187.2 | >4/>9 | 2.10/14.5 | 5.35 |
| 4 | 20.2/323.2 | 3.60/9.1 | 5.00/34.5 | 11.54 |
| 5 | 22.6/361.6 | 3.20/8.1 | Not Determined | |
| 6 | >30.6/>490 | 3.20/8.1 | Not Determined | |
| 7 | 20.7/331.2 | >4/>9 | 6.50/44.9 | 5.64 |
| 8 | >30.6/>490 | >4/>9 | Not Determined | |
| 9 | 22.5/360 | Not Determined | Not Determined | |
| 10 | 19.7/315.2 | 0.50/1.3 | 9.75/67.3 | 13.02 |

EXAMPLE 2

This example demonstrates the utility of the present compositions for preparing foamed-in-place gaskets.

The ingredients of composition 2 described in Example 1 were blended by passing them through a static mixer that was 8.75 inches (22.2 cm.) long, 0.25 inch (0.64 cm) in internal diameter and contained 32 Kenics type elements. The composition was extruded from the static mixer through a nozzle exhibiting a diameter of 0.240 in (6.1 mm) and a thickness of 0.12 in (3.0 mm).

The pressure required to transport the composition through the mixer and nozzle was generated using compressed air. The equipment used to extrude the composition is described in the examples of U.S. Pat. No. 5,222,627, the relevant portions of which are incorporated by reference.

The composition was extruded onto a horizontal surface as a continuous bead. The height of the bead was 8 mm and the width was 12.5 mm. The composition cured in about 2 minutes when heated at a temperature of 50° C. to a bead exhibiting a width of 12.57 mm and a height of 9.51 mm.

For purposes of comparison a bead was extruded and cured using composition 3 of example 1 in the preceding section of this specification, which did not contain the thixotropic additive and carbon black present in composition 1. The cured bead was 12.68 mm. wide and 4.69 mm. high, indicative of substantial flow prior to curing.

That which is claimed is:

1. In an improved foamable organosiloxane composition comprising
   A. a liquid polyorganosiloxane containing at least two reactive groups per molecule selected from the group consisting of silanol groups and alkenyl radicals;
   B. an amount sufficient to foam and cure said composition of an organohydrogensiloxane containing at least three silicon-bonded hydrogen atoms per molecule wherein there is no more than one of said hydrogen atoms per silicon atom;
   C. a compound containing at least one carbinol or silanol group per molecule, and
   D. as the catalyst, an amount of a metal from the platinum group of the periodic table or a compound of said metal sufficient to promote foaming and curing of said composition, the improvement comprising the presence in said composition of a thixotropic additive in an amount sufficient to prevent substantial flowing of said composition prior to curing, said additive consisting essentially of the hydrogenated glyceride of at least one ethylenically unsaturated hydroxycarboxylic acid containing from 12 to 20 carbon atoms.

2. A composition according to claim 1 wherein said polyorganosiloxane is a polydiorganosiloxane wherein at least 90 percent of the repeating units are diorganosiloxane units represented by the general formula $R^1R^2SiO$ where $R^1$ and $R^2$ are individually selected from monovalent unsubstituted and substituted hydrocarbon radicals that typically contain from 1 to 10 carbon atoms, said alkenyl radicals are vinyl radicals, any silanol-containing polyorganosiloxane constitutes at least a portion of ingredient A; said compound containing at least one carbinol group per molecule as an alcohol, and said thixotropic additive is a hydrogenated castor oil.

3. A composition according to claim 2 wherein said thixotropic additive constitutes from 0.5 to 5 weight percent of said composition; the monovalent hydrocarbon radicals present in said polyorganosiloxane and said organohydrogensiloxane are selected from the group consisting of alkyl, phenyl and 3,3,3-trifluoropropyl; said composition cures by a hydrosilation reaction; said organohydrogensiloxane comprises 1) a linear organosiloxane copolymer exhibiting a viscosity of from 0.01 to 10 Pa.s at 25° C. and consisting essentially of dialkylsiloxane and alkylhydrogensiloxane units with trialkylsiloxy terminal units, and 2) a linear polyorganohydrogensiloxane; the molar ratio of silicon-bonded hydrogen atoms to the combination of alkenyl radicals, silanol groups and carbinol groups is from 3.5:1 to 5.5:1; and said composition further comprises a non-linear organosiloxane copolymer comprising trimethylsiloxy and $SiO_{4/2}$ units and at least one non-reinforcing filler.

4. A composition according to claim 3 where said thixotropic additive constitutes from 1 to 4 weight percent of said composition, at least one of the hydrocarbon radicals bonded to each silicon atom of said polyorganosiloxane and said organohydrogensiloxane is a methyl radical, and said linear organosiloxane copolymer constitutes at least half of the total weight of organohydrogensiloxane present in said composition.

5. A composition according to claim 1 wherein said composition is packaged in at least two containers, said organohydrogensiloxane and said catalyst being located in different containers.

* * * * *